(12) United States Patent
Ren

(10) Patent No.: US 9,325,237 B2
(45) Date of Patent: Apr. 26, 2016

(54) POWER SUPPLY WITH CHARGE PUMP AND CONTROL METHOD

(75) Inventor: Yuancheng Ren, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 950 days.

(21) Appl. No.: 13/554,497

(22) Filed: Jul. 20, 2012

(65) Prior Publication Data

US 2013/0020960 A1    Jan. 24, 2013

(30) Foreign Application Priority Data

Jul. 21, 2011    (CN) .......................... 2011 1 0204911

(51) Int. Cl.
*H05B 37/02* (2006.01)
*H02M 3/07* (2006.01)

(52) U.S. Cl.
CPC ...................................... *H02M 3/07* (2013.01)

(58) Field of Classification Search
CPC ............ H02M 3/07; G05F 1/10; H05B 37/02
USPC .................. 315/224, 230, 237–238, 252, 268
See application file for complete search history.

(56) References Cited

U.S. PATENT DOCUMENTS

| | | | |
|---|---|---|---|
| 7,190,210 B2* | 3/2007 | Azrai et al. | 327/536 |
| 2008/0150619 A1* | 6/2008 | Lesso et al. | 327/536 |
| 2008/0211316 A1* | 9/2008 | Watanabe et al. | 307/110 |
| 2010/0118572 A1* | 5/2010 | Mednik et al. | 363/90 |
| 2011/0274295 A1* | 11/2011 | Motoki | H02M 3/07 381/120 |

* cited by examiner

*Primary Examiner* — Jimmy Vu
*Assistant Examiner* — Henry Luong
(74) *Attorney, Agent, or Firm* — Perkins Coie LLP

(57) ABSTRACT

The present invention provides a power supply comprising a driver and a charge pump. The driver is configured to provide a driving signal to a load. The charge pump comprises a first capacitor coupled to the load in parallel, at least one flying capacitor, a second capacitor and a switch array comprising a plurality of switches. The switch array is coupled to the first capacitor, the second capacitor and the at least one flying capacitor. The switch array receives the voltage across the first capacitor and controls the charge and discharge of the at least one flying capacitor, so as to make the voltage across the second capacitor be larger than the voltage across the first capacitor.

14 Claims, 4 Drawing Sheets

POWER SUPPLY WITH CHARGE PUMP AND CONTROL METHOD

CROSS-REFERENCE TO RELATED APPLICATION(S)

This application claims the benefit of CN application 201110204911.2, filed on Jul. 21, 2011, and incorporated herein by reference.

TECHNICAL FIELD

Embodiments of the present invention generally relate to electronic circuits, and more particularly but not exclusively to power supplies with charge pump and control methods thereof.

BACKGROUND

Generally, output capacitors with large capacitance are needed in drivers which provide energy to a DC load, so as to absorb the AC portion of the output power. However, the output capacitors with large capacitance are big and high-cost, and the capacitor type is limited. This problem is more critical in LED drivers.

LED has been quickly adopted as a new lighting source because of its high efficiency and environment friendly. Unlike the conventional incandescent lamp, LED cannot be directly driven by the AC line. A driver is needed to convert the AC input into a DC current source. In addition, any LED driver with power rating higher than 5 W needs to satisfy the Power Factor (PF) and Total Harmonic Distortion (THD) requirements. As a result, passive Power Factor Correction (PFC) circuits or active PFC technology is used in these LED drivers.

FIG. 1 is a working waveform of a LED driver with PFC function, wherein $v_{in}$ is the input voltage, $i_{in}$ is the input current, $p_{in}$ is the input power and $v_o$ is the output voltage. As long as the PFC is used, the input power doesn't meet the instantaneous power. As a result, an output capacitor with large capacitance is needed to store the energy and reduce the ripple. Normally, an electrolytic capacitor is used because of its large capacitance and high voltage rating. Other types of capacitor can hardly meet both high voltage and large capacitance requirements.

However, a big shortcoming of the electrolytic capacitor is its short life time. It can hardly achieve over 10,000 hours. Comparing with the average life time of LED (>50,000 hours), the electrolytic capacitor has been a major barrier to achieve a long life time of the whole lamp fixture.

SUMMARY

Embodiments of the present invention are directed to a power supply comprising a driver and a charge pump. The driver is configured to provide a driving signal to a load. The charge pump comprises a first capacitor coupled to the load in parallel, at least one flying capacitor, a second capacitor and a switch array comprising a plurality of switches. The switch array is coupled to the first capacitor, the second capacitor and the at least one flying capacitor. The switch array receives the voltage across the first capacitor and controls the charge and discharge of the at least one flying capacitor, so as to make the voltage across the second capacitor be larger than the voltage across the first capacitor.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
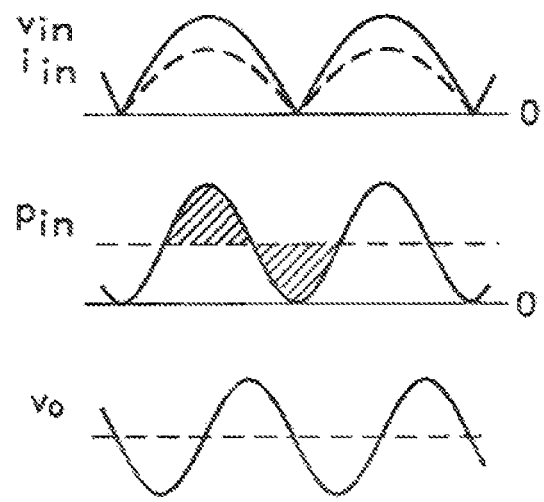
FIG. 1 is a working waveform of a LED driver with PFC function
Figure 2:
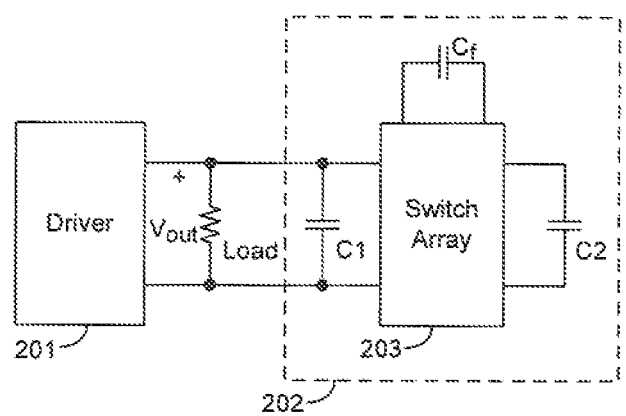
FIG. 2 is a block diagram of a power supply in accordance with an embodiment of the present disclosure.

FIG. 2 is a block diagram of a power supply in accordance with an embodiment of the present disclosure. The power supply comprises a driver 201 and a charge pump 202. The driver 201 is configured to provide a driving signal to a load. The driver 201 may be a switching circuit, a low dropout regulator or any other known driving circuits. In an embodiment, the driver 201 has power factor correction (PFC) function. In one embodiment, the driver 201 may be a flyback converter, a boost converter or other DC/DC converter with PFC function. The load comprises one or more LEDs.

The charge pump 202 comprises a first capacitor C1, a switch array 203, at least one flying capacitor $C_f$ and a second capacitor C2. The first capacitor C1 is coupled to the load in parallel. The switch array 203 comprising a plurality of switches is coupled to the first capacitor C1, the second capacitor C2 and the at least one flying capacitor $C_f$. The switch array 203 receives the voltage $V_{out}$ across the first capacitor C1 and controls the charge and discharge of the at least one flying capacitor $C_f$, so as to make the voltage across the second capacitor C2 be larger than the voltage $V_{out}$ across the first capacitor C1. For example, the voltage across the second capacitor C2 is n times larger than the voltage $V_{out}$, wherein n is a constant larger than 1 or a variable chosen from multiple constants larger than 1 based on the connection of the switches in the switch array 203. The switches in the switch array 203 may be any controllable semiconductor devices, such as MOSFET, BJT, IGBT and so on. In one embodiment, the switches in the switching array 203 are integrated in a chip.

Since the voltage across the second capacitor C2 is n times larger than the voltage $V_{out}$ across the first capacitor C1 and the power stored in a capacitor can be calculated by $0.5*C*V^2$, under the same output power, the capacitance of the second capacitor C2 can be reduced to $1/n^2$ of the capacitance of the output capacitor in the prior art. For capacitors of same type, this will result in volume reduction and cost down. Furthermore, since the capacitance is reduced, the second capacitor C2 is no limited to electrolytic capacitor anymore. Ceramic capacitors, film capacitors, and other types of capacitors can also be used. The life time of the ceramic capacitor and film capacitor are both longer than that of the electrolytic capacitor. The volume and cost of the ceramic capacitor and film capacitor are also much less. In one embodiment, the first capacitor C1, the second capacitor C2 and the at least one flying capacitor $C_f$ are all, ceramic capacitors or film capacitors.

In one embodiment, the switch array 203 comprises a first group of switches and a second group of switches. In a first state, the first group of switches are turned on and the second group of switches are turned off, the at least one flying capacitor $C_f$ is charged by the voltage $V_{out}$ across the first capacitor C1. In a second state, the first group of switches are turned off and the second group of switches are turned on, the voltage across the second capacitor C2 is increased to a sum of the voltage $V_{out}$ across the first capacitor C1 and the voltage across the at least one flying capacitor $C_f$.

Figure 3:
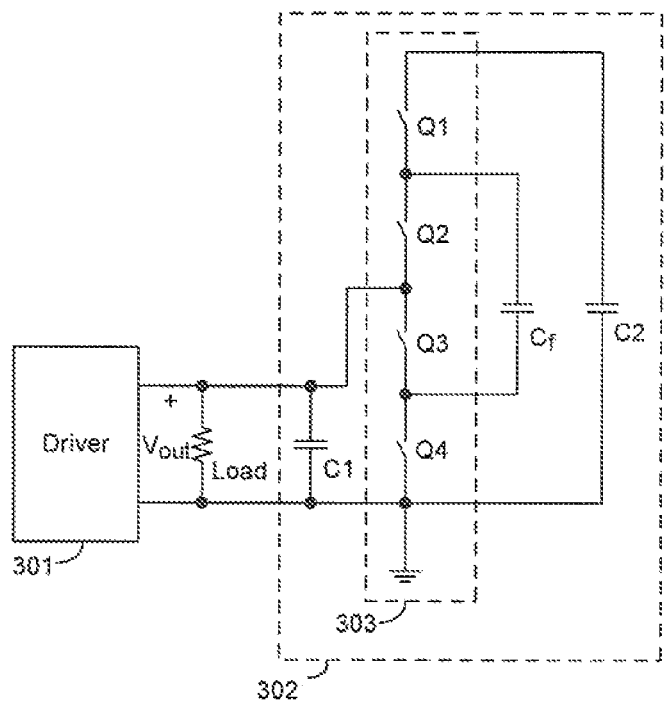
FIG. 3 is a schematic diagram of a power supply in accordance with an embodiment of the present disclosure.

FIG. 3 is a schematic diagram of a power supply in accordance with an embodiment of the present disclosure. The charge pump 302 comprises a first capacitor C1, a switch array 303, a flying capacitor $C_f$ and a second capacitor C2. The first capacitor C1 is coupled to the load in parallel. The switch array 303 comprises a first group of switches and a second group of switches. The first group of switches comprises switches Q2 and Q4, the second group of switches comprises switches Q1 and Q3. The first terminal of the switch Q1 is coupled to the first terminal of the second capacitor C2, the second terminal of the switch Q1 is coupled to the first terminal of the switch Q2 and the first terminal of the flying capacitor $C_f$. The second terminal of the switch Q2 is coupled to the first terminal of the first capacitor C1 and the first terminal of the switch Q3, the second terminal of the switch Q3 is coupled to the first terminal of the switch Q4 and the second terminal of the flying capacitor $C_f$. The second terminal of the switch Q4 is coupled to the second terminal of the first capacitor C1 and the second terminal of the second capacitor C2.

When the switches Q2 and Q4 are turned on, the switches Q1 and Q3 are turned off, the flying capacitor $C_f$ is charged and the voltage across it is increased to the voltage $V_{out}$ across the first capacitor C1. When the switches Q2 and Q4 are turned off, the switches Q1 and Q3 are turned on, the first capacitor C1 and the flying capacitor $C_f$ are serially coupled. The voltage across the second capacitor C2 is increased to a sum of the voltage $V_{out}$ across the first capacitor C1 and the voltage across the flying capacitor $C_f$, which is $2*V_{out}$. Since the voltage across the second capacitor C2 is $2*V_{out}$, under the same output power, the capacitance of the second capacitor C2 can be reduced to ¼ of the capacitance of the output capacitor in the prior art.

Figure 4:
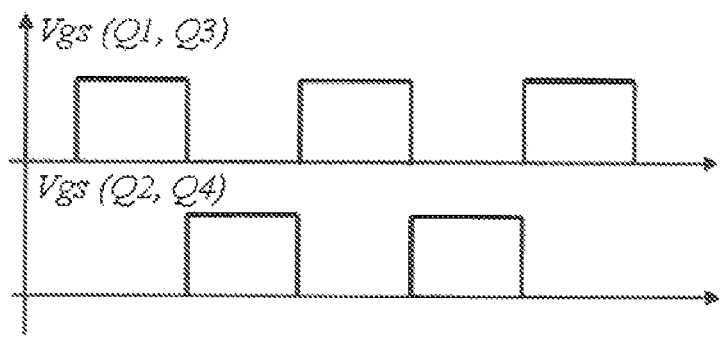
FIG. 4 is a working waveform of the power supply shown in FIG. 3 in accordance with one embodiment of the present disclosure.

In order to maintain the charge and discharge balance of the flying capacitor $C_f$, the on-time of the switches Q2 and Q4 are generally equal to that of the switches Q1 and Q3. FIG. 4 is a working waveform of the power supply shown in FIG. 3 in accordance with one embodiment of the present disclosure. $V_{gs}$(Q1, Q3) are the gate-source voltages of switches Q1 and Q3, $V_{gs}$(Q2, Q4) are the gate-source voltages of switches Q2 and Q4. As shown in FIG. 4, the duty cycles of switches Q1~Q4 are all 50%, so as to achieve the best charge transfer efficiency.

Figure 5:
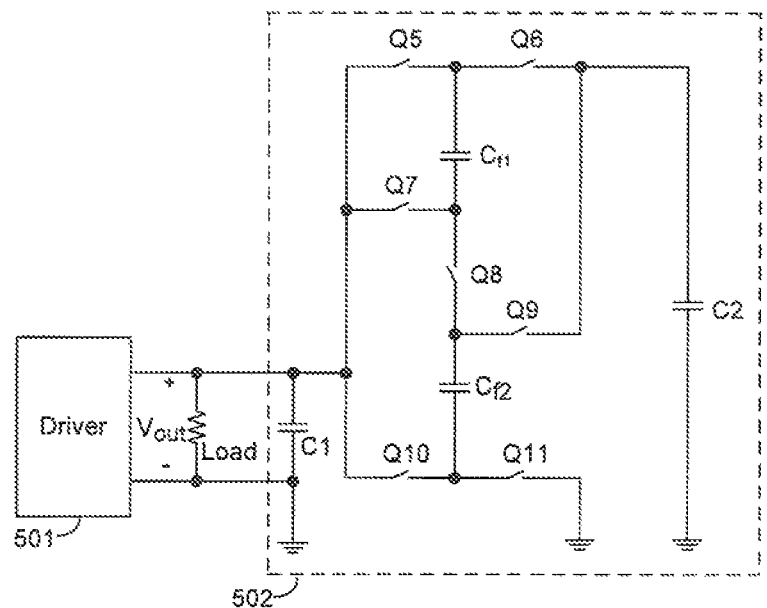
FIG. 5 is a schematic diagram of a power supply in accordance with another embodiment of the present disclosure.

FIG. 5 is a schematic diagram of a power supply in accordance with another embodiment of the present disclosure. The charge pump 502 comprises a first capacitor C1, a switch array 503, flying capacitors $C_{f1}$ and $C_{f2}$, and a second capacitor C2. The first capacitor C1 is coupled to the load in parallel. The switch array 503 comprises a first group of switches and a second group of switches. The first group of switches comprises switches Q5, Q8 and Q11, the second group of switches comprises switches Q6, Q7, Q9 and Q10. The first terminal of the switch Q5 is coupled to the first terminal of the first capacitor C1, the second terminal of the switch Q5 is coupled to the first terminal of the switch Q6 and the first terminal of the flying capacitor $C_{f1}$. The second terminal of the switch Q6 is coupled to the first terminal of the switch Q9 and the first terminal of the second capacitor C2. The first terminal of the switch Q7 is coupled to the first terminal of the first capacitor C1, the second terminal of the switch Q7 is coupled to the second terminal of the flying capacitor $C_{f1}$ and the first terminal of the switch Q8. The second terminal of the switch Q8 is coupled to the second terminal of the switch Q9 and the first terminal of the flying capacitor $C_{f2}$. The first terminal of the switch Q10 is coupled to the first terminal of the first capacitor C1, the second terminal of the switch Q10 is coupled to the second terminal of the flying capacitor $C_{f2}$ and the first terminal of the switch Q11. The second terminal of the switch Q11 is coupled to the second terminal of the first capacitor C1 and the second terminal of the second capacitor C2. The on-time of the switches Q5~Q11 are basically the same. In one embodiment, the duty cycles of switches Q5~Q11 are all 50%, so as to achieve the best charge transfer efficiency.

When the switches Q5, Q8 and Q11 are turned on, the switches Q6, Q7, Q9 and Q10 are turned off, the flying capacitors $C_{f1}$ and $C_{f2}$ are charged and the voltage across them are increased to $0.5*V_{out}$. When the switches Q5, Q8 and Q11 are turned off, the switches Q6, Q7, Q9 and Q10 are turned on, the first capacitor C1 is serially coupled to the flying capacitors $C_{f1}$ and $C_{f2}$ which are coupled in parallel. The voltage across the second capacitor C2 is increased to a sum of the voltage $V_{out}$ across the first capacitor C1 and the voltage across the flying capacitors $C_{f1}$ and $C_{f2}$, which is $1.5*V_{out}$. Since the voltage across the second capacitor C2 is $1.5*V_{out}$, under the same output power, the capacitance of the second capacitor C2 can be reduced to 1/2.25 of the capacitance of the output capacitor in the prior art.

Figure 6:
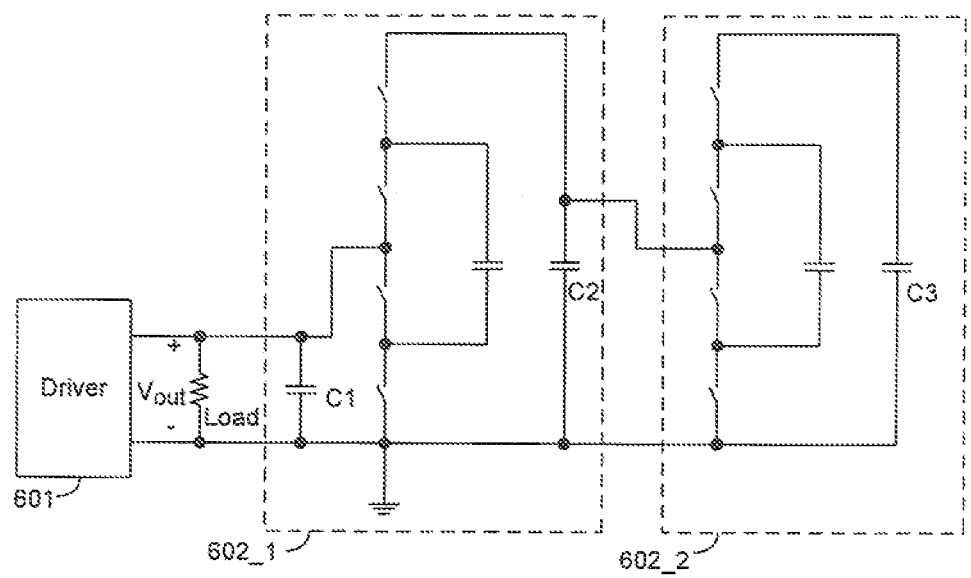
FIG. 6 is a schematic diagram of a power supply in accordance with still another embodiment of the present disclosure.

A plurality of charge pumps can be coupled in cascade in a power supply, so as to further increase the voltage across the output capacitor and reduce the capacitance of the output capacitor. FIG. 6 is a schematic diagram of a power supply in accordance with still another embodiment of the present disclosure. Two charge pumps 602_1 and 602_2 similar to the charge pump 302 shown in FIG. 3 are coupled in cascade. The voltage across the capacitor C3 is $4*V_{out}$. Under the same output power, the capacitance of the second capacitor C3 can be reduced to 1/16 of the capacitance of the output capacitor in the prior art. Although the structure of the charge pumps 602_1 and 602_2 are the same, persons skilled in the art can recognize that charge pumps with different structures and different voltage amplification can also be used and does not depart from the spirit of the invention.

In one embodiment, the output voltage $V_{out}$ of the driver 601 is 16V, and the load current is 0.5 A. Under the substantially same voltage ripple, the prior art without charge pump needs two electrolytic capacitors connected in parallel whose capacitance are both 470 uF. In the embodiment shown in FIG. 6, we only need $C1=C_{f3}=10$ uF, $C2=C_{f4}=22$ uF, $C3=47$ uF, and all these five capacitors can be ceramic capacitors or film capacitors. Furthermore, since the switches in the charge pumps 602_1 and 602_2 all achieve zero current switching and zero voltage switching during operation, the switching loss is eliminated. Because the on-resistance of the switches is generally small (such as 200 mOhm), the power dissipation of the charge pumps 602_1 and 602_2 are very low, such as 0.1 W.

Figure 7:
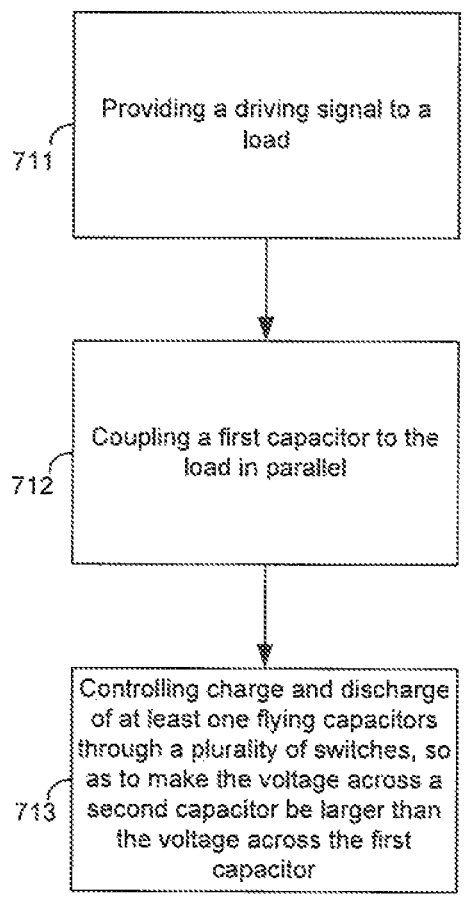
FIG. 7 is a flow chart of a method for supplying power to a load, in accordance with an embodiment of the present disclosure.

FIG. 7 is a flow chart of a method for supplying power to a load, in accordance with an embodiment of the present disclosure. The method comprises steps 711~713.

At step 711, a driving signal is provided to a load.

At step 712, a first capacitor is coupled to the load in parallel.

At step 713, the charge and discharge of at least one flying capacitors are controlled through a plurality of switches, so as to make the voltage across a second capacitor be larger than the voltage across the first capacitor.

Since the voltage across the second capacitor is larger than the voltage across the first capacitor, under the same output power, the capacitance of the second capacitor is reduced compared with the output capacitor in the prior art. For capacitors of same type, this will result in volume reduction and cost down. Furthermore, since the capacitance is reduced, the second capacitor is no limited to electrolytic capacitor anymore. Ceramic capacitors, film capacitors, and other types of capacitors can also be used.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A charge pump used in a power supply providing driving signal to a load, comprising:
   a first capacitor coupled to the load in parallel, wherein the first capacitor has a first terminal and a second terminal;
   at least one flying capacitor, wherein each flying capacitor has a first terminal and a second terminal;
   a second capacitor having a first terminal and a second terminal;
   a switch array comprising a plurality of switches, wherein the switch array is coupled to the first capacitor, the second capacitor and the at least one flying capacitor, and wherein the switch array receives the voltage across the first capacitor and controls the charge and discharge of the at least one flying capacitor, so as to make the voltage across the second capacitor be larger than the voltage across the first capacitor, wherein the switch array comprises a first group of switches and a second group of switches, and wherein:
   in a first state, the first group of switches are turned on and the second group of switches are turned off, the at least one flying capacitor is charged by the voltage across the first capacitor;
   in a second state, the first group of switches are turned off and the second group of switches are turned on, the voltage across the second capacitor is increased to a sum of the voltage across the first capacitor and the voltage across the at least one flying capacitor; and
   the first group of switches comprises a second switch and a fourth switch, the second group of switches comprises a first switch and a third switch, each switch has a first terminal and a second terminal, wherein the first terminal of the first switch is coupled to the first terminal of the second capacitor, the second terminal of the first switch is coupled to the first terminal of the second switch and the first terminal of a flying capacitor, the second terminal of the second switch is coupled to the first terminal of the first capacitor and the first terminal of the third switch, the second terminal of the third switch is coupled to the first terminal of the fourth switch and the second terminal of the flying capacitor, the second terminal of the fourth switch is coupled to the second terminal of the first capacitor and the second terminal of the second capacitor.

2. The charge pump of claim 1, wherein the duty cycles of the first, second, third and fourth switches are all 50%.

3. The charge pump of claim 1, wherein the first group of switches comprises a fifth switch, a eighth switch and a eleventh switch, the second group of switches comprises a sixth switch, a seventh switch, a ninth switch and a tenth switch, each switch has a first terminal and a second terminal, wherein the first terminal of the fifth switch is coupled to the first terminal of the first capacitor, the second terminal of the fifth switch is coupled to the first terminal of the sixth switch and the first terminal of a first flying capacitor, the second terminal of the sixth switch is coupled to the first terminal of the ninth switch and the first terminal of the second capacitor, the first terminal of the seventh switch is coupled to the first terminal of the first capacitor, the second terminal of the seventh switch is coupled to the second terminal of the first flying capacitor and the first terminal of the eighth switch, the second terminal of the eighth switch is coupled to the second terminal of the ninth switch and the first terminal of a second flying capacitor, the first terminal of the tenth switch is coupled to the first terminal of the first capacitor, the second terminal of the tenth switch is coupled to the second terminal of the second flying capacitor and the first terminal of the eleventh switch, the second terminal of the eleventh switch is coupled to the second terminal of the first capacitor and the second terminal of the second capacitor.

4. The charge pump of claim 3, wherein the duty cycles of the fifth, sixth, seventh, eighth, ninth, tenth and eleventh switches are all 50%.

5. The charge pump of claim 1, wherein the first capacitor, the second capacitor and the at least one flying capacitor are ceramic capacitors or film capacitors.

6. The charge pump of claim 1, wherein the switching array is integrated in a chip.

7. The charge pump of claim 1, where in the load is one or more LEDs.

8. A power supply, comprising:
   a driver providing a driving signal to a load;
   a charge pump comprising:

a first capacitor coupled to the load in parallel, wherein the first capacitor has a first terminal and a second terminal;

at least one flying capacitor, wherein each flying capacitor has a first terminal and a second terminal;

a second capacitor having a first terminal and a second terminal;

a switch array comprising a plurality of switches, wherein the switch array is coupled to the first capacitor, the second capacitor and the at least one flying capacitor;

wherein the switch array receives the voltage across the first capacitor and controls the charge and discharge of the at least one flying capacitor, so as to make the voltage across the second capacitor be larger than the voltage across the first capacitor, the switch array comprises a first group of switches and a second group of switches, and wherein:

in a first state, the first group of switches are turned on and the second group of switches are turned off, the at least one flying capacitor is charged by the voltage across the first capacitor;

in a second state, the first group of switches are turned off and the second group of switches are turned on, the voltage across the second capacitor is increased to a sum of the voltage across the first capacitor and the voltage across the at least one flying capacitor; and the first group of switches comprises a second switch and a fourth switch, the second group of switches comprises a first switch and a third switch, each switch has a first terminal and a second terminal, wherein the first terminal of the first switch is coupled to the first terminal of the second capacitor, the second terminal of the first switch is coupled to the first terminal of the second switch and the first terminal of a flying capacitor, the second terminal of the second switch is coupled to the first terminal of the first capacitor and the first terminal of the third switch, the second terminal of the third switch is coupled to the first terminal of the fourth switch and the second terminal of the flying capacitor, the second terminal of the fourth switch is coupled to the second terminal of the first capacitor and the second terminal of the second capacitor.

9. The power supply of claim 8, wherein the duty cycles of the first, second, third and fourth switches are all 50%.

10. The power supply of claim 8, wherein the first group of switches comprises a fifth switch, a eighth switch and a eleventh switch, the second group of switches comprises a sixth switch, a seventh switch, a ninth switch and a tenth switch, each switch has a first terminal and a second terminal, wherein the first terminal of the fifth switch is coupled to the first terminal of the first capacitor, the second terminal of the fifth switch is coupled to the first terminal of the sixth switch and the first terminal of a first flying capacitor, the second terminal of the sixth switch is coupled to the first terminal of the ninth switch and the first terminal of the second capacitor, the first terminal of the seventh switch is coupled to the first terminal of the first capacitor, the second terminal of the seventh switch is coupled to the second terminal of the first flying capacitor and the first terminal of the eighth switch, the second terminal of the eighth switch is coupled to the second terminal of the ninth switch and the first terminal of a second flying capacitor, the first terminal of the tenth switch is coupled to the first terminal of the first capacitor, the second terminal of the tenth switch is coupled to the second terminal of the second flying capacitor and the first terminal of the eleventh switch, the second terminal of the eleventh switch is coupled to the second terminal of the first capacitor and the second terminal of the second capacitor.

11. The power supply of claim 8, wherein the first capacitor, the second capacitor and the at least one flying capacitor are ceramic capacitors or film capacitors.

12. The power supply of claim 8, wherein the switching array is integrated in a chip.

13. The power supply of claim 8, comprising a plurality of charge pumps coupled in cascade.

14. The power supply of claim 8, wherein the driver has power factor correction function and the load is one or more LEDs.

* * * * *